(12) United States Patent
Kishi et al.

(10) Patent No.: US 10,501,078 B2
(45) Date of Patent: Dec. 10, 2019

(54) VEHICLE CONTROL APPARATUS

(71) Applicant: Honda Motor Co., Ltd., Tokyo (JP)

(72) Inventors: Takayuki Kishi, Wako (JP); Yoshiaki Konishi, Wako (JP); Toshiyuki Mizuno, Wako (JP); Akira Kito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/175,743

(22) Filed: Oct. 30, 2018

(65) Prior Publication Data

US 2019/0135280 A1 May 9, 2019

(30) Foreign Application Priority Data

Nov. 6, 2017 (JP) .................. 2017-213806

(51) Int. Cl.
*B60W 30/16* (2012.01)
*B60W 10/20* (2006.01)
(Continued)

(52) U.S. Cl.
CPC .......... *B60W 30/162* (2013.01); *B60W 10/06* (2013.01); *B60W 10/10* (2013.01);
(Continued)

(58) Field of Classification Search
CPC .......... B62D 1/28; B62D 6/001; B62D 6/002; B60W 30/165; B60W 30/095; B60W 30/162; B60W 30/0956; B60W 10/06; B60W 10/10; B60W 10/20; B60W 2050/0005; B60W 2520/10; B60W 2550/308; B60W 2600/00; B60W 2710/0666; B60W 2720/106; G05D 1/0217; G05D 1/0088; G05D 1/021; G05D 1/00;
(Continued)

(56) References Cited

U.S. PATENT DOCUMENTS

2016/0209843 A1* 7/2016 Meuleau ............ G05D 1/0088
2016/0311431 A1* 10/2016 Kato .................... B62D 1/28
(Continued)

FOREIGN PATENT DOCUMENTS

JP  2016222150 A  12/2016

*Primary Examiner* — Behrang Badii
(74) *Attorney, Agent, or Firm* — Duft & Bornsen, PC

(57) ABSTRACT

A vehicle control apparatus including a surrounding circumstances detector detecting surrounding circumstances of a self-driving vehicle and an electric control unit including a microprocessor configured to perform generating an action plan of the self-driving vehicle based on the surrounding circumstances and controlling the engine and the transmission so that the self-driving vehicle travels by self-driving in accordance with the action plan. The generating includes generating a first action plan and a second action plan, the first action plan including target position data of the self-driving vehicle, the second action plan including an acceleration instruction to a target vehicle speed not including the target position data, and the controlling includes controlling the engine and the transmission, so that the self-driving vehicle accelerates to the target vehicle speed at a target torque minimizing a fuel consumption quantity per unit travel distance when the second action plan is generated.

18 Claims, 9 Drawing Sheets

(51) Int. Cl.
*B60W 10/10* (2012.01)
*B60W 10/06* (2006.01)
*B60W 50/00* (2006.01)
*B62D 1/28* (2006.01)
*G05D 1/00* (2006.01)
*B60W 30/165* (2012.01)

(52) U.S. Cl.
CPC ........... *B60W 10/20* (2013.01); *B60W 30/165* (2013.01); *B60W 2050/0005* (2013.01); *B60W 2520/10* (2013.01); *B60W 2550/308* (2013.01); *B60W 2600/00* (2013.01); *B60W 2710/0666* (2013.01); *B60W 2720/106* (2013.01); *B62D 1/28* (2013.01); *G05D 1/00* (2013.01); *G05D 1/0088* (2013.01)

(58) Field of Classification Search
CPC .. G05D 1/0297; G05D 1/0212; G05D 1/0274; G01C 21/3617; G01C 21/36; G01C 21/3407; A01B 79/005; G08G 1/0125; G08G 1/056; G08G 1/00; G08G 1/202; G08G 1/146; G06Q 10/047
See application file for complete search history.

(56) References Cited

U.S. PATENT DOCUMENTS

2017/0192431 A1\* 7/2017 Foster ................. G05D 1/0217
2018/0188734 A1\* 7/2018 Zhu .................... B60W 30/095

\* cited by examiner

VEHICLE CONTROL APPARATUS

CROSS-REFERENCE TO RELATED APPLICATION

This application is based upon and claims the benefit of priority from Japanese Patent Application No. 2017-213806 filed on Nov. 6, 2017, the content of which is incorporated herein by reference.

BACKGROUND OF THE INVENTION

Field of the Invention

This invention relates to a vehicle control apparatus for controlling vehicle having a self-driving capability.

Description of the Related Art

Conventionally, there is a known apparatus of this type, configured to generate an action plan including a route to a destination and to control a transmission speed ratio of a vehicle based on the action plan so that the vehicle travels along the route in a self-driving. Such an apparatus is described in Japanese Unexamined Patent Publication No. 2016-222150 (JP2016-222150A), for example. The apparatus described in JP2016-222150A, is configured to enable selection of self-drive mode and manual drive mode and to set different shift charts between self-drive mode and manual drive mode so that upshifting is performed farther toward low vehicle speed side when self-drive mode is selected than when manual drive mode is selected.

The apparatus according to JP2016-222150A aims to improve fuel economy in self-drive mode by setting a different shift chart in self-drive mode from that in manual drive mode. However, it leaves room for still greater fuel efficiency in situations in which required driving force of the subject vehicle need not be distinctly set, such as, for example, during gradual acceleration to a set speed in an environment with no surrounding vehicles.

SUMMARY OF THE INVENTION

An aspect of the present invention is a vehicle control apparatus of a self-driving vehicle for controlling a self-driving vehicle with a self-driving capability including an engine, drive wheels, and a transmission installed in a power transmission path from the engine to the drive wheels, including: a surrounding circumstances detector configured to detect surrounding circumstances of the self-driving vehicle; and an electric control unit including a microprocessor and a memory. The microprocessor is configured to perform: generating an action plan of the self-driving vehicle based on the surrounding circumstances detected by the surrounding circumstances detector; and controlling the engine and the transmission so that the self-driving vehicle travels by self-driving in accordance with the action plan generated, wherein the generating includes generating a first action plan and a second action plan, the first action plan including target position data of the self-driving vehicle set every a unit time within a predetermined time period of a present time, the second action plan including an acceleration instruction from a vehicle speed of the self-driving vehicle at a present time to a target vehicle speed not including the target position data set every the unit time, and the controlling includes controlling the engine and the transmission, so that the self-driving vehicle travels in accordance with the target position data set every the unit time when the first action plan is generated, while so that the self-driving vehicle accelerates to the target vehicle speed at a target torque when the second action plan is generated, the target torque being set between a first characteristic curve representing a maximum torque relative to an engine speed and a second characteristic curve representing a torque corresponding to a minimum brake-specific fuel consumption relative to the engine speed and being set so as to minimize a fuel consumption quantity per a unit travel distance.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
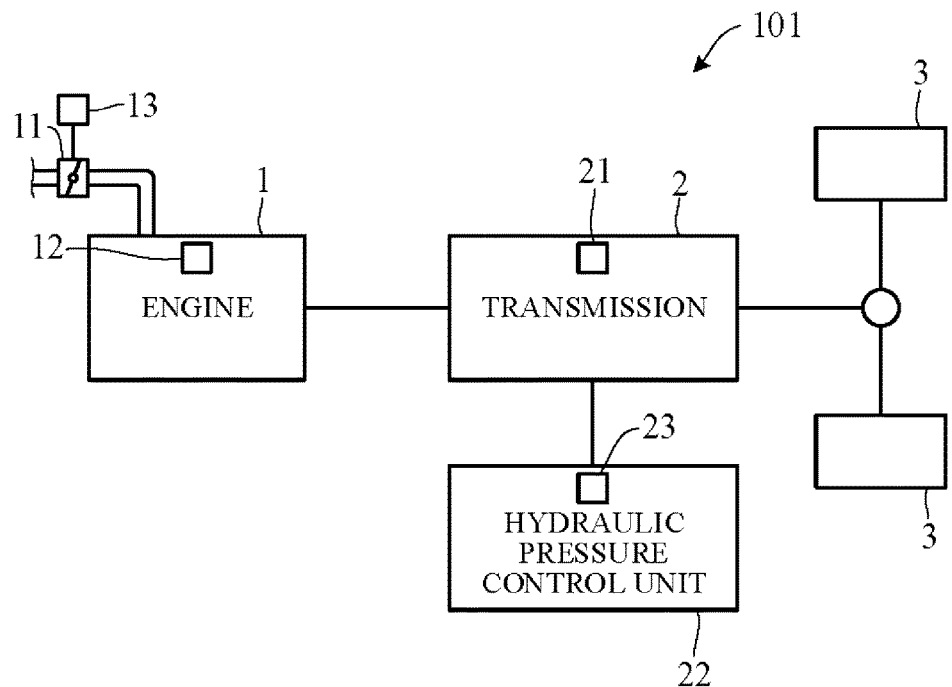
FIG. 1 is a diagram showing a configuration overview of a driving system of a self-driving vehicle to which a vehicle control apparatus according to an embodiment of the present invention is applied.

Hereinafter, an embodiment of the present invention is explained with reference to FIGS. 1 to 13. A vehicle control apparatus according to an embodiment of the present invention is applied to a vehicle (self-driving vehicle) having a self-driving capability. FIG. 1 is a diagram showing a configuration overview of a driving system of a self-driving vehicle 101 incorporating a vehicle control apparatus according to the present embodiment. Herein, the self-driving vehicle may be sometimes called "subject vehicle"

to differentiate it from other vehicles. The vehicle 101 is not limited to driving in a self-drive mode requiring no driver driving operations but is also capable of driving in a manual drive mode by driver operations.

As shown in FIG. 1, the vehicle 101 includes an engine 1 and a transmission 2. The engine 1 is an internal combustion engine (e.g., gasoline engine) wherein intake air supplied through a throttle valve 11 and fuel injected from an injector 12 are mixed at an appropriate ratio and thereafter ignited by a sparkplug or the like to burn explosively and thereby generate rotational power. A diesel engine or any of various other types of engine can be used instead of a gasoline engine. Air intake volume is regulated by the throttle valve 11 and opening angle of the throttle valve 11 is varied by driving of a throttle actuator 13 operating in response to an electric signal. Opening angle of the throttle valve 11 and quantity of fuel injected from the injectors 12 (injection timing and injection duration) is controlled by a controller 40 (FIG. 2).

The transmission 2, which is installed in a power transmission path between the engine 1 and drive wheels 3, varies speed ratio of rotation of from the engine 1, and converts and outputs torque from the engine 1. The rotation of speed converted by the transmission 2 is transmitted to the drive wheels 3, thereby propelling the vehicle 101. Optionally, the vehicle 101 can be configured as a hybrid vehicle by providing a drive motor as a drive power source in addition to the engine 1.

The transmission 2 is, for example, a stepped transmission enabling stepwise speed ratio (gear ratio) shifting in accordance with multiple (e.g. six) speed stages. Optionally, a continuously variable transmission enabling stepless speed ratio shifting can be used as the transmission 2. Although omitted in the drawings, power from the engine 1 can be input to the transmission 2 through a torque converter. The transmission 2 can, for example, incorporate a dog clutch, friction clutch or other engaging element 21. A hydraulic pressure control unit 22 can shift speed stage of the transmission 2 by controlling flow of oil to the engaging element 21. The hydraulic pressure control unit 22 includes a solenoid valve or other valve mechanism operated by electric signals (called "shift actuator 23" for sake of convenience), and an appropriate speed stage can be implemented by changing flow of hydraulic pressure to the engaging element 21 in response to operation of the shift actuator 23.

Figure 2:
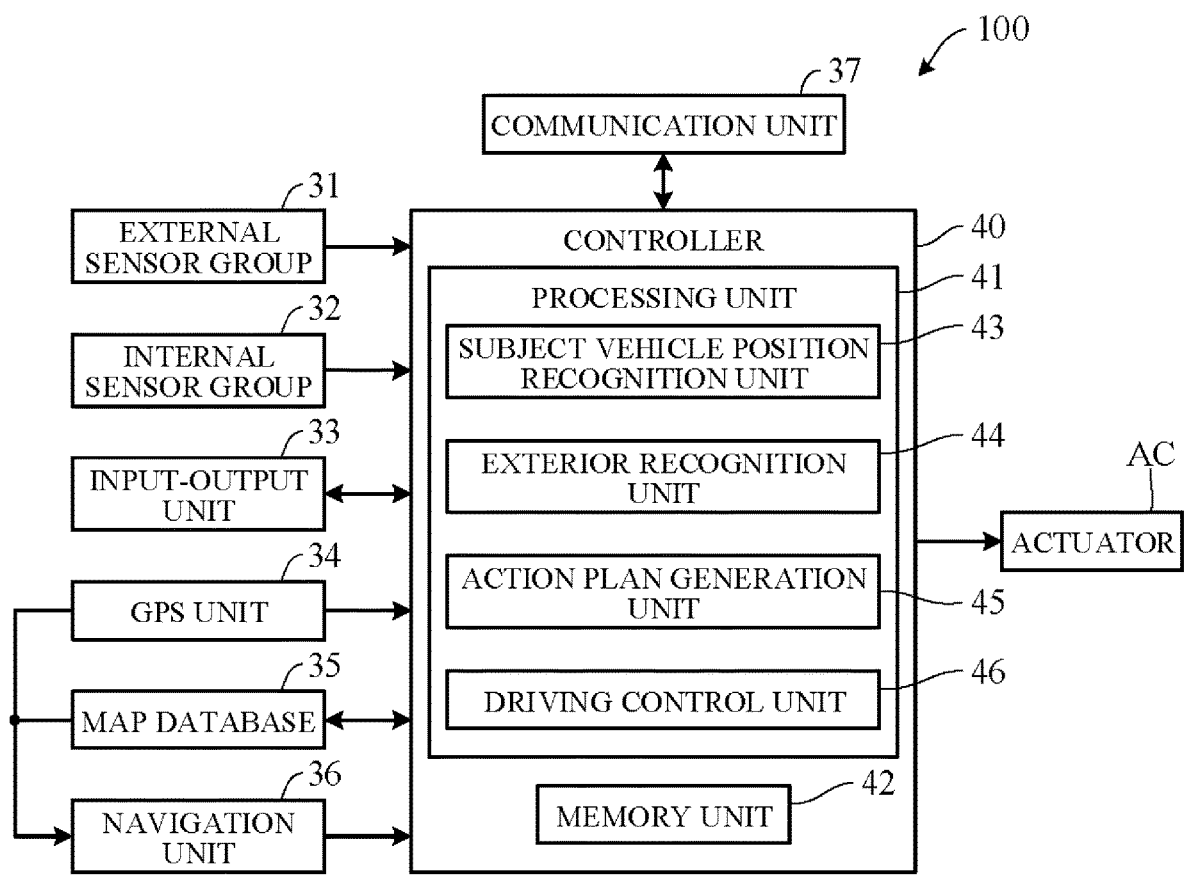
FIG. 2 is the block diagram schematically illustrating overall configuration of the vehicle control apparatus according to the embodiment of the present invention.

FIG. 2 is a block diagram schematically illustrating overall configuration of a vehicle control apparatus 100 according to an embodiment of the present invention. As shown in FIG. 2, the vehicle control apparatus 100 is configured centered on a controller 40 and includes mainly of the controller 40, and as members electrically connected thereto through CAN (Controller Area Network) communication or the like, an external sensor group 31, an internal sensor group 32, an input-output unit 33, a GPS unit 34, a map database 35, a navigation unit 36, a communication unit 37, and actuators AC.

The term external sensor group 31 herein is a collective designation encompassing multiple sensors (external sensors) for detecting external circumstances constituting subject vehicle ambience data. For example, the external sensor group 31 includes, inter alia, a LIDAR (Light Detection and Ranging) for measuring distance from the vehicle to ambient obstacles by measuring scattered light produced by laser light radiated from the subject vehicle in every direction, a RADAR (Radio Detection and Ranging) for detecting other vehicles and obstacles around the subject vehicle by radiating electromagnetic waves and detecting reflected waves, and a CCD, CMOS or other image sensor-equipped on-board cameras for imaging subject vehicle ambience (forward, reward and sideways).

The term internal sensor group 32 herein is a collective designation encompassing multiple sensors (internal sensors) for detecting subject vehicle driving state. For example, the internal sensor group 32 includes, inter alia, an engine speed sensor for detecting engine rotational speed, a vehicle speed sensor for detecting subject vehicle running speed, acceleration sensors for detecting subject vehicle forward-rearward direction acceleration and lateral acceleration, respectively, a yaw rate sensor for detecting rotation angle speed around a vertical axis through subject vehicle center of gravity, and a sensor for detecting an opening angle of the throttle valve 11 (throttle opening angle). The internal sensor group 32 also includes sensors for detecting driver driving operations in manual drive mode, including, for example, accelerator pedal operations, brake pedal operations, steering wheel operations and the like.

The term input-output unit 33 is used herein as a collective designation encompassing apparatuses receiving instructions input by the driver and outputting information to the driver. For example, the input-output unit 33 includes, inter alia, switches which the driver uses to input various instructions by operating operation members, a microphone which the driver uses to input voice instructions, a display for presenting information to the driver via displayed images, and a speaker for presenting information to the driver by voice. The switches include a mode select switch for instructing either self-drive mode or manual drive mode.

The GPS unit 34 includes a GPS receiver for receiving position determination signals from multiple GPS satellites, and measures absolute position (latitude, longitude and the like) of the subject vehicle based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33. Target routes are computed based on subject vehicle current position measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are provided to perform driving of the vehicle 101. The actuators AC include a throttle actuator 13 for adjusting throttle opening angle of the engine 1, a shift actuator 23 for changing speed stage of the transmission 2, a brake actuator for operating a braking device, and a steering actuator for driving a steering unit.

The controller 40 is constituted by an electronic control unit (ECU). In FIG. 2, the controller 40 is integrally configured by consolidating multiple function-differentiated ECUs such as an engine control ECU, a transmission control ECU, a clutch control ECU and so on. Optionally, these ECUs can be individually provided. The controller 40 incorporates a computer including a CPU or other processing unit (a microprocessor) 41, the memory unit (a memory) 42 of RAM, ROM, hard disk and the like, and other peripheral circuits not shown in the drawings.

The memory unit 42 stores high-accuracy detailed map data including, inter alia, lane center position data and lane boundary line data. More specifically, road data, traffic regulation data, address data, facility data, telephone number data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores a shift map (shift chart) serving as a shift operation reference. The memory unit 42 also stores a shift map (shift chart) serving as a shift operation reference.

As functional configurations, the processing unit 41 includes a subject vehicle position recognition unit 43, an exterior recognition unit 44, an action plan generation unit 45, and a driving control unit 46.

The subject vehicle position recognition unit 43 recognizes map position of the subject vehicle (subject vehicle position) based on subject vehicle position data calculated by the GPS unit 34 and map data stored in the map database 35. Optionally, the subject vehicle position can be recognized using map data (building shape data and the like) stored in the memory unit 42 and ambience data of the vehicle 101 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the subject vehicle based on signals from cameras, LIDERs, RADARs and the like of the external sensor group 31. For example, it recognizes position, speed and acceleration of nearby vehicles driving in the vicinity of the subject vehicle, position of vehicles stopped or parked in the vicinity of the subject vehicle, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a subject vehicle driving path (target path) from present time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time Δt (e.g., 0.1 sec) between present time point and a predetermined time period T (e.g., 5 sec) ahead, i.e., includes action plan data set in association with every unit time Δt interval. The action plan data include subject vehicle position data and vehicle state data for every unit time Δt. The position data are, for example, data indicating 2D coordinate position on road, and the vehicle state data are vehicle speed data indicating vehicle speed, direction data indicating subject vehicle direction, and the like. The vehicle state data can be determined from position data change of successive unit times Δt. Action plan is updated every unit time Δt.

Figure 3:
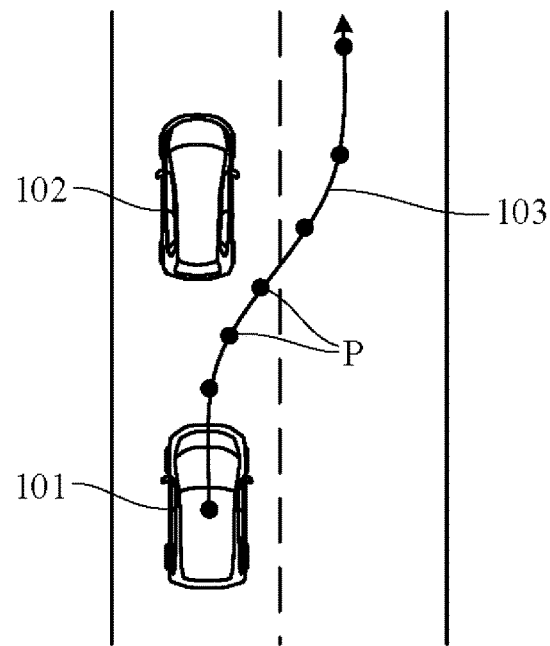
FIG. 3 is a diagram showing an example of an action plan generated by an action plan generation unit of FIG. 2.

FIG. 3 is a diagram showing an action plan generated by the action plan generation unit 45. FIG. 3 shows a scene depicting an action plan for the subject vehicle 101 when changing lanes and overtaking a forward vehicle 102 (preceding vehicle). Points P in FIG. 3 correspond to position data at every unit time Δt between present time point and predetermined time period T1 ahead. A target path 103 is obtained by connecting the points P in time order. The action plan generation unit 45 generates not only overtake action plans but also various other kinds of action plans for, inter alia, lane-changing to move from one traffic lane to another, lane-keeping to maintain same lane and not stray into another, and decelerating or accelerating.

In self-drive mode, the driving control unit 46 controls the actuators AC to drive the subject vehicle 101 along target path 103 generated by the action plan generation unit 45. For example, the driving control unit 46 controls the throttle actuator 13, shift actuator 23, brake actuator and steering actuator so as to drive the subject vehicle 101 through the points P of the unit times Δt in FIG. 3. On the other hand, in manual drive mode, the driving control unit 46 controls the actuators AC in accordance with driving instructions by the driver acquired from the internal sensor group 32.

In relation to controlling of the shift actuator 23, the driving control unit 46 calculates a target acceleration of the subject vehicle 101 based on data representing a vehicle speed change included in the action plan generated by the action plan generation unit 45. In addition, the driving control unit 46 calculates required driving force for achieving the target accelerations taking running resistance caused by road gradient and the like into account. Further, the driving control unit 46 controls shift operation of the transmission 2 by outputting control signals to the shift actuator 23 using a shift map stored in the memory unit 42 in advance to serve as a shift operation reference. The acceleration becomes a positive value in acceleration, and becomes a negative value in deceleration.

Figure 4:
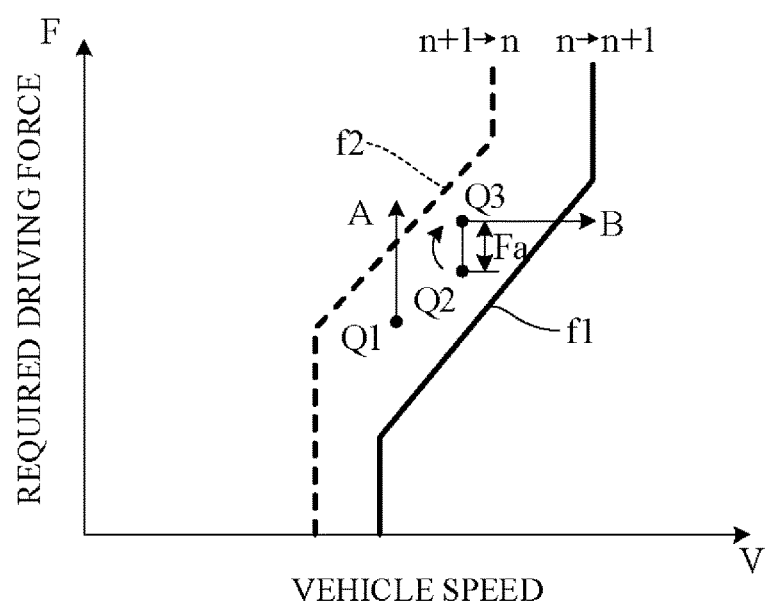
FIG. 4 is a diagram showing an example of a shift map used in a shift operation.

FIG. 4 is a diagram showing an example of the shift map stored in the memory unit 42. In the drawing, horizontal axis is scaled for vehicle speed V and vertical axis for required driving force F. Required driving force F is in one-to-one correspondence to accelerator opening angle (in self-drive mode, simulated accelerator opening angle) or throttle opening angle, and required driving force F increases with increasing accelerator opening angle or throttle opening angle. Therefore, the vertical axis can instead be scaled for accelerator opening angle or throttle opening angle. Characteristic curve (solid line) f1 is an example of an upshift curve corresponding to upshift from n stage to n+1 stage and characteristic curve f2 (dashed line) is an example of a downshift curve corresponding to downshift from n+1 stage to n stage.

For example, considering downshift from operating point Q1 as shown in FIG. 4, in a case where required driving force F increases under constant vehicle speed V, the transmission 2 downshifts from n+1 stage to n stage when operating point Q1 crosses downshift curve (characteristics f2) (arrow A). On the other hand, looking for example at upshift from operating point Q2, in a case where vehicle speed V increases under constant required driving force F, the transmission 2 upshifts from n stage to n+1 stage when operating point Q3, obtained by adding predetermined excess driving force Fa to required driving force F at operating point Q2, crosses upshift curve (characteristics f1) (arrow B).

In other words, as regards upshift, upshift tendency of the transmission 2 is restrained by raising apparent required driving force F by excess driving force Fa and by delaying upshift timing than when excess driving force Fa is 0 (operating point Q2). As a result, busy shifting condition marked by frequent downshifting and upshifting, so called shift hunting, can be avoided. Excess driving force Fa can be either a fixed value or a variable value with vehicle speed or required driving force as a parameter.

In the so-configured vehicle control apparatus 100, the driving control unit 46 calculates acceleration (target acceleration) and required driving force for every unit time Δt based on vehicle speeds (target vehicle speeds) on the target path 103 (FIG. 3) at the points P of the individual unit times Δt. In addition, the driving control unit 46 feedback controls the actuators AC to bring actual acceleration detected by the internal sensor group 32, for example, into coincidence with target acceleration. By adding excess driving force Fa to required driving force to restrict upshifting at this time, busy shifting can be avoided even when required driving force varies owing to change in actual acceleration caused by moderate change in road gradient during vehicle running.

Of interest in this regard is that when the subject vehicle is running in self-driving mode, situations arise in which distinct required driving force is unnecessary. For example, distinct required driving force premised on presence of a forward vehicle is unnecessary in a case where, for example, no other vehicles are present around the subject vehicle, more particularly in a case where the external sensor group 31 does not recognize presence of a forward vehicle (preceding vehicle), or even if it does, distance between the subject vehicle and the forward vehicle is equal to or greater than a predetermined value that makes vehicle-following, overtaking and other autonomous running with respect to the forward vehicle impossible to perform. In such cases, a problem such as explained below emerges when a configuration is adopted that sets required driving force and accelerates the subject vehicle to a set speed (target vehicle speed).

Figure 5:
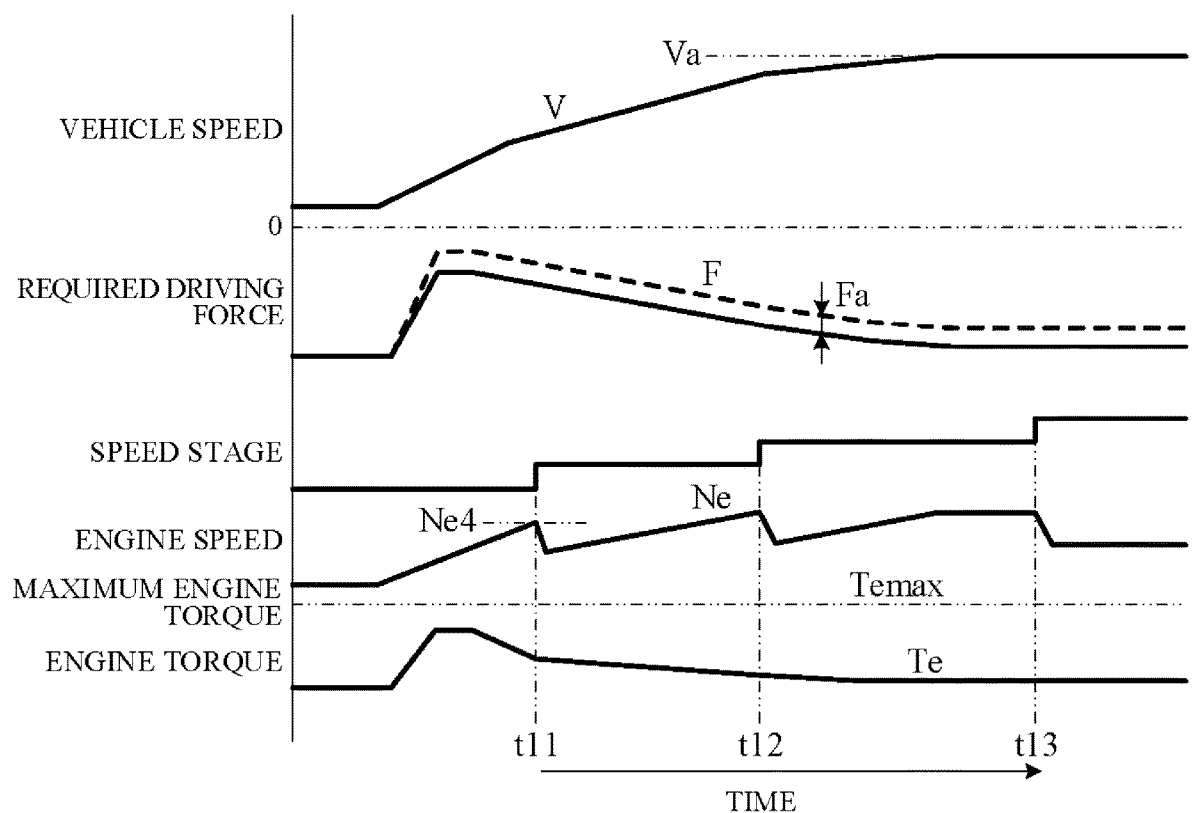
FIG. 5 is a diagram showing a time chart for explaining a problem in accelerating.

FIG. 5 is a time chart indicating an example of change over time of vehicle speed V, required driving force F, speed stage, engine speed Ne and engine torque Te in case of accelerating to target vehicle speed Va under condition of no vehicle present ahead. In other words, FIG. 5 is an example of vehicle running based on an action plan including future subject vehicle position data and vehicle speed data, during which running, as shown in FIG. 5, required driving force F for achieving target acceleration is generated.

As mentioned above, excess driving force Fa is added to required driving force F to avoid busy shifting, and the transmission 2 is up-shifted based on required driving force after addition of excess driving force Fa. Since this delays up-shift time, engine speed increases at times t11, t12 and t13. The resulting high engine speed despite acceleration being gradual seems quite odd to subject vehicle passengers. Louder noise caused by the higher engine speed also annoys passengers. In order to overcome these issues, the vehicle control apparatus 100 according to the present embodiment is configured as set out in the following.

Figure 6:
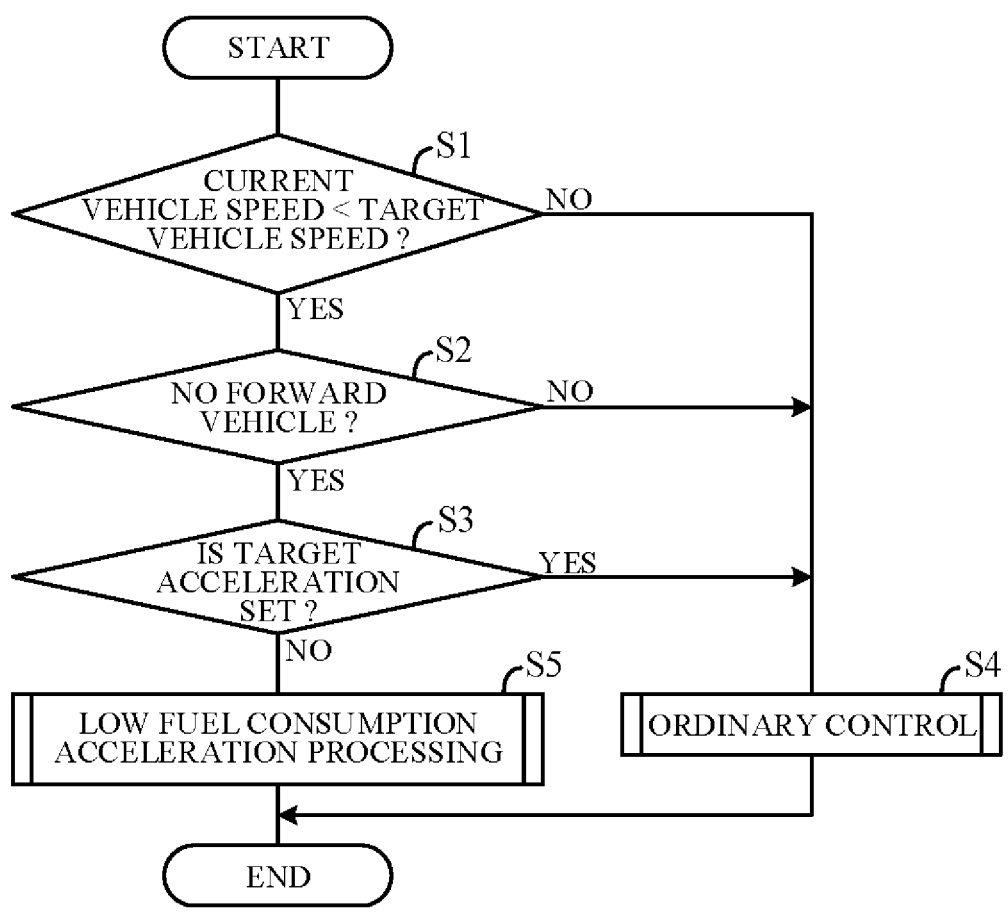
FIG. 6 is a flow chart showing an example of processing performed by a processing unit of FIG. 2.

FIG. 6 is a flowchart showing an example of processing performed by the processing unit 41 (microprocessor) in accordance with a program stored in the memory unit 42 in advance. Processing indicated in this flowchart is started, for example, when self-drive mode is selected and repeated at predetermined intervals.

First, in S1 (S: processing step), whether current vehicle speed V detected by the internal sensor group 32 (vehicle speed sensor) is less than target vehicle speed Va. Target vehicle speed Va is, for example, set at legal speed limit for the road. When vehicle-following is performed with respect to a forward vehicle, target vehicle speed Va is set based on speed of the forward vehicle. During subject vehicle acceleration, a positive decision is made at S1 and the routine proceeds to S2. During cruising or deceleration, a negative decision is made at S1 and the routine proceeds to S4.

In S2, it is determined whether a forward vehicle is recognized by the exterior recognition unit 44 based on signals from the external sensor group 31. If a positive decision is made at S2, the routine proceeds to S3, and if a negative decision is made, the routine proceeds to S4. In S3, whether target acceleration is set based on an action plan (position data and vehicle speed data) generated by the action plan generation unit 45 is determined. For example, when the subject vehicle changes lanes and accelerates in accordance with an action plan for overtaking a forward vehicle, a target acceleration is set following lane change even though no vehicle is present ahead. In this case, a positive decision is made at S3 and the routine proceeds to S4.

In S4, the driving control unit 46 performs ordinary control. More specifically, in order control the subject vehicle to travel in accordance with the action plan generated by the action plan generation unit 45, the driving control unit 46 outputs control signals to the actuators AC (throttle actuator 13, shift actuator 23, etc.) and also controls driving of the engine 1 and transmission 2. This results, for example, in the transmission 2 being downshifted or upshifted in accordance with a shift map (FIG. 4). Thanks to the addition of excess driving force Fa to required driving force, busy shifting can be avoided particularly as regards upshifting.

Figure 7:
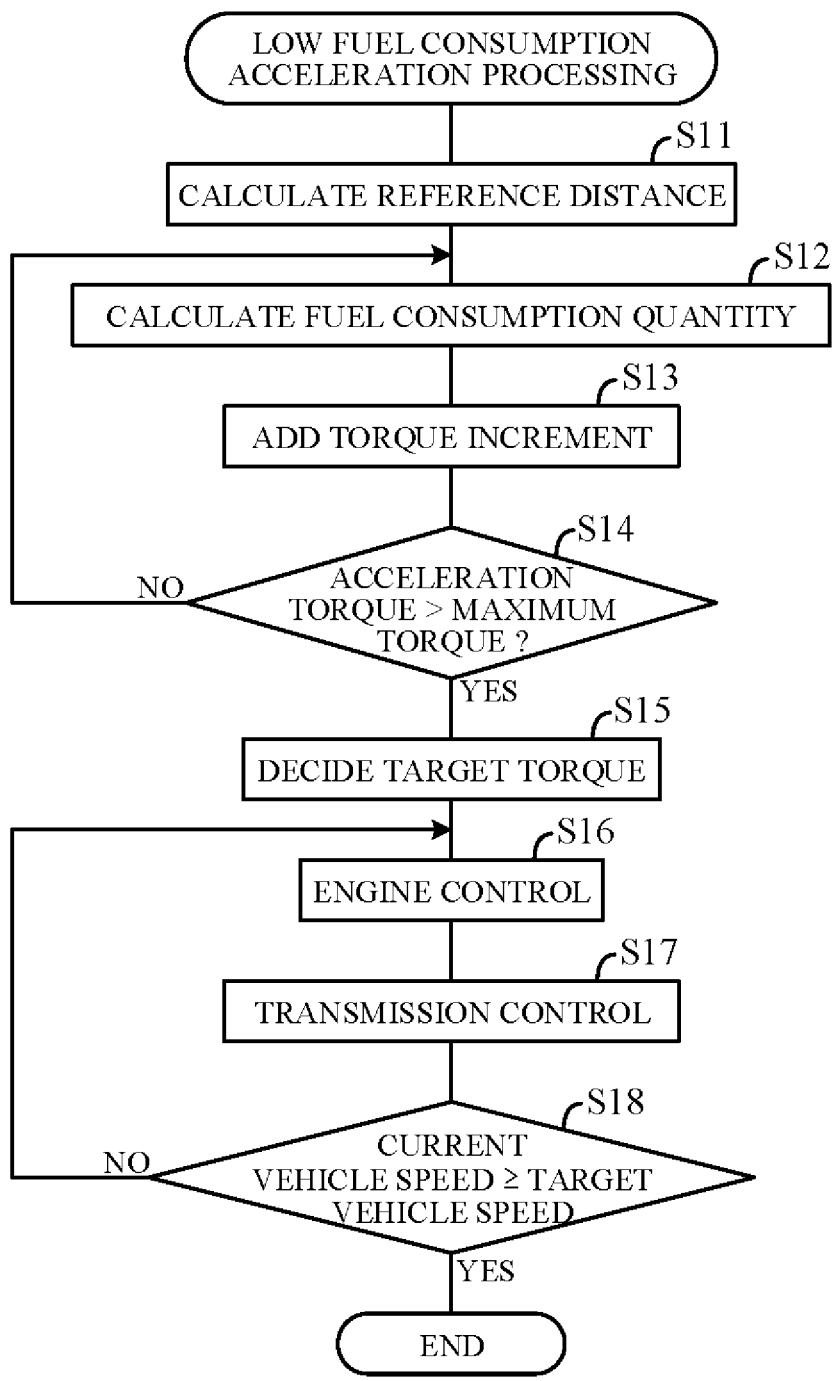
FIG. 7 is a flow chart showing an example of a low fuel consumption acceleration processing of FIG. 6.

On the other hand, if a negative decision is made at S3, the routine proceeds to S5. In S5, the driving control unit 46 performs acceleration processing (low fuel consumption acceleration processing) for enabling realization of improved fuel economy and better sound performance. The low fuel consumption acceleration processing is performed when no distinct acceleration demand is present, such as when overtaking with no vehicle present ahead, in order to accelerate the subject vehicle to target vehicle speed Va at a rate of acceleration equal to or greater than a minimum acceleration stored in the memory unit 42 beforehand. FIG. 7 is a flowchart showing an example of the low fuel consumption acceleration processing of S5. The processing shown in this flowchart is performed using a performance curve of the engine 1 stored in the memory unit 42 in advance.

Figure 8:
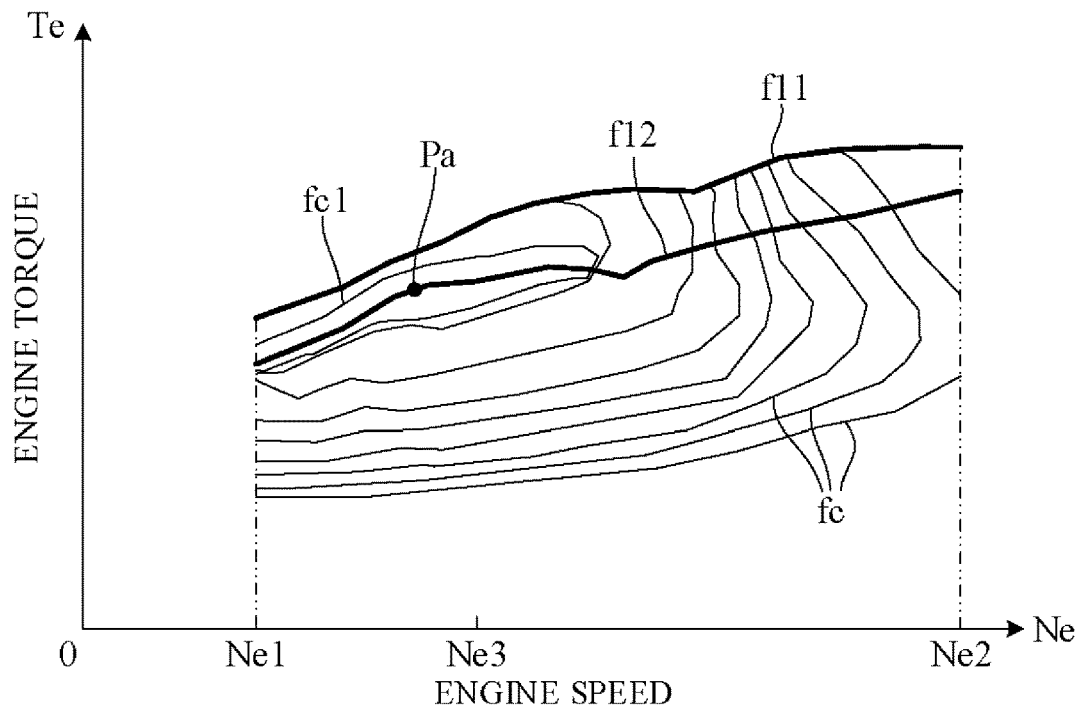
FIG. 8 is a diagram showing an example of an engine performance curve of FIG. 1.

FIG. 8 is a diagram showing an example of an engine performance curve indicating relation between engine speed Ne and engine torque Te, particularly an example of an engine performance curve in region between low-speed range and medium-speed range of engine speed (Ne1≤Ne≤Ne2). Ne1 is typically idle speed of the engine 1. FIG. 8 also shows multiple isoefficiency curves fc connecting points of equal efficiency (an engine efficiency map). Maximum efficiency point Pa, i.e., point of highest engine efficiency, is located near the middle of inward most isoefficiency curve fc1 and engine efficiency declines moving outward from maximum efficiency point Pa.

Characteristic curve f11 in the drawing represents maximum torque of the engine 1. Characteristic curve f12 represents torque associated with lowest brake-specific fuel consumption (BSFC), so-called BSFC bottom torque. In other words, characteristic curve f12 connects engine torques of optimum engine efficiency over engine speed range.

During low fuel consumption acceleration processing, the transmission 2 is upshifted when engine speed is low. In the present embodiment, therefore, an upshift shift map suitable for low fuel consumption acceleration processing is in advance stored in the memory unit 42 together with the ordinary shift map (FIG. 4).

Figure 9:
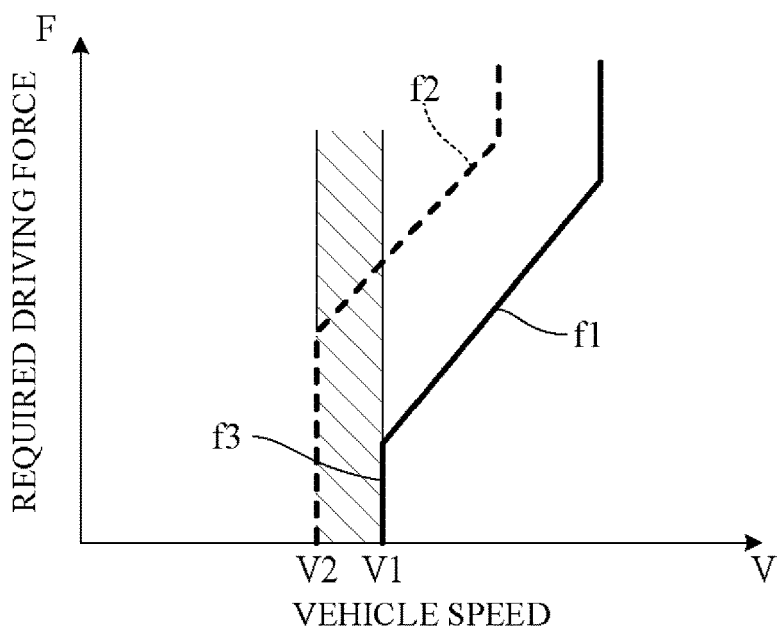
FIG. 9 is a diagram showing an example of an upshift curve used in the low fuel consumption acceleration processing of FIG. 6.

FIG. 9 is a diagram showing an example of an upshift characteristic curve f3 defining upshift from n stage to n+1 stage of the transmission 2 during low fuel consumption acceleration processing. This characteristic curve f3 is established relative to characteristic curves f1 and f2 of FIG. 4. Specifically, characteristic curve f3 is set in a region indicated by oblique lines between upshift minimum vehicle speed V1 defined by characteristic curve f1 (minimum vehicle speed V1 capable of upshifting) and downshift minimum vehicle speed V2 defined by characteristic curve f2 (minimum vehicle speed V2 capable of downshifting). For example, characteristic curve f3 is set at vehicle speed V1 as shown in FIG. 9. In such case, the transmission 2 upshifts from n stage to n+1 stage when actual vehicle speed V exceeds V1. Vehicle speed on the upshift curve (characteristic curve f3) is called "upshift vehicle speed."

Although not illustrated, the upshift curve for upshifting from n+1 stage to n+2 stage is obtained by moving characteristic curve f3 farther to high vehicle high speed side. In other words, upshift vehicle speed moves increasingly to high vehicle speed side with transition to higher speed stage. Upshift vehicle speeds of the individual speed stages are, for example, set to values so as to upshift with respect a certain running resistance at the same or substantially the same engine speed (Ne3 of FIG. 8) at every speed stage. This ensures that the subject vehicle accelerates in a low speed region of engine speed equal to or less than predetermined value Ne3.

Figure 10:
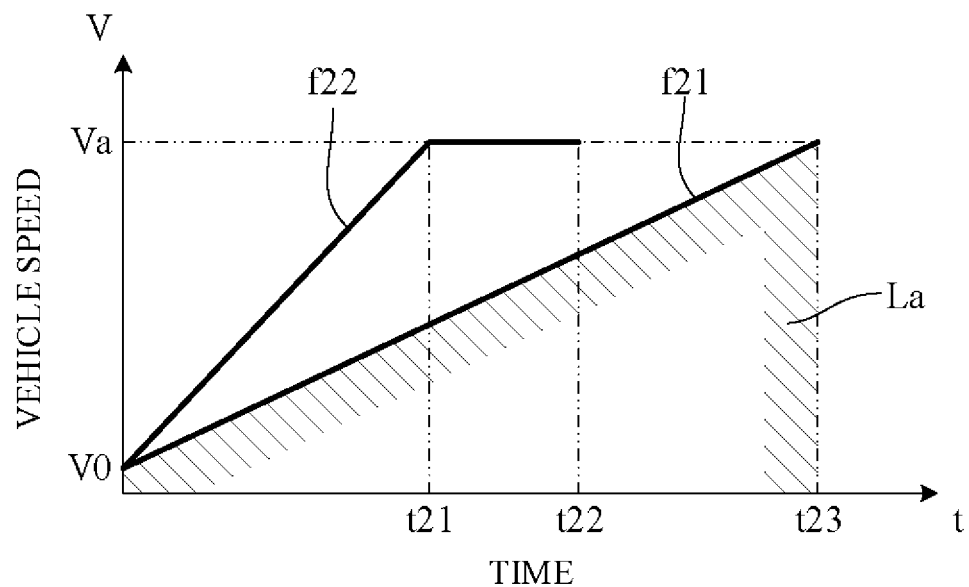
FIG. 10 is a diagram showing an example of time-course change of vehicle speed when accelerating to target vehicle speed at BSFC bottom torque and when accelerating to target vehicle speed at maximum torque.

FIG. 10 is a diagram showing an example of time-course change of vehicle speed V when the subject vehicle is accelerated from current vehicle speed V0 to target vehicle speed Va under low fuel consumption acceleration processing. Characteristic curve f21 in the diagram represents an example of acceleration at BSFC bottom torque (characteristic curve f12 of FIG. 8) and characteristic curve f22 represents an example of acceleration at maximum torque (characteristic curve f11 of FIG. 8). Since BSFC bottom torque is smaller than maximum torque, acceleration (characteristic curve slope) is smaller during acceleration at BSFC bottom torque than during acceleration at maximum torque.

As a result, target vehicle speed Va is reached at time t21 when accelerating at maximum torque, while target vehicle speed Va is reached at time t23 (time to which is termed "reference time") later than time t21 when accelerating at BSFC bottom torque. Travel distance up to target vehicle speed Va under BSFC bottom torque (termed "reference distance La") corresponds to area of hatched region under characteristic curve f21. In acceleration under maximum torque, the subject vehicle cruises at target vehicle speed Va after once reaching target vehicle speed Va. This means that the subject vehicle travels reference distance La by time t22 before elapse of reference time t23.

Figure 11:
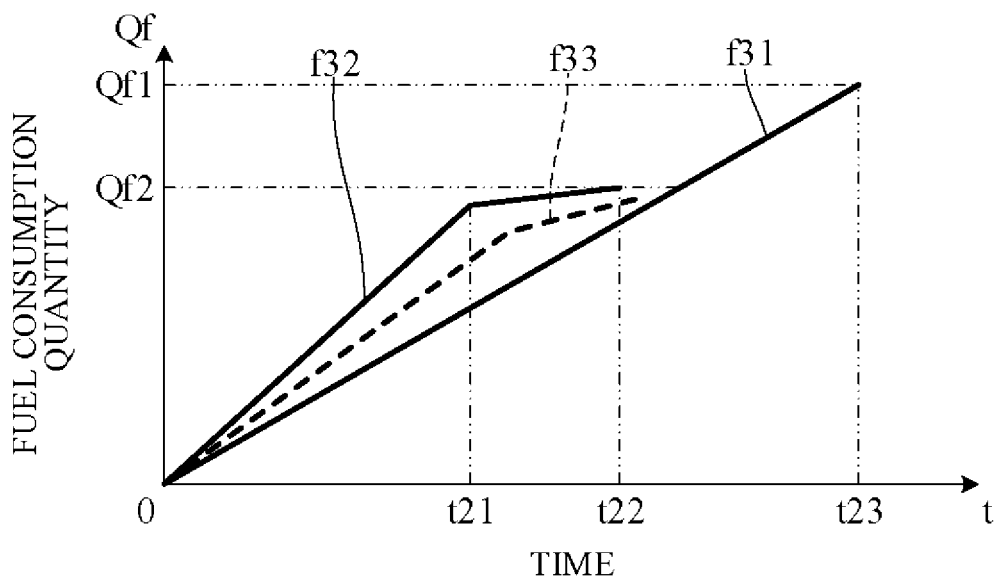
FIG. 11 is a diagram showing an example of time-course change of fuel consumption quantity when accelerating to target vehicle speed at BSFC bottom torque and when accelerating to target vehicle speed at maximum torque.

FIG. 11 is a diagram showing an example of time-course change of fuel consumption quantity Qf in a case of traveling the reference distance La while accelerating under low fuel consumption acceleration processing. Alternatively, similar characteristics can be obtained by dividing fuel consumption quantity Qf by reference distance La and rescaling the vertical axis for fuel consumption rate. Characteristic curve f31 of FIG. 11 represents an example of acceleration at BSFC bottom torque (corresponding to characteristic curve f21 of FIG. 10), and characteristic curve f32 represents an example of acceleration at maximum torque (corresponding to characteristic curve f22 of FIG. 10). In acceleration at BSFC bottom torque, fuel is consumed at constant rate (fuel consumption rate) up to time t23 and final fuel consumption quantity Qf becomes Qf1.

When accelerating at maximum torque on the other hand, fuel consumption quantity per unit time up to reaching target vehicle speed Va at time t21 is greater than fuel consumption quantity per unit time when accelerating at BSFC bottom torque. However, engine torque Te is small from time t21 to time t22 because the subject vehicle is cruising. Fuel consumption quantity per unit time during this period (from t21 to t22) is therefore small, so that fuel consumption quantity Qf up to reference distance La becomes Qf2.

In the example of FIG. 11, fuel consumption quantity is lower when accelerating at maximum torque than when accelerating at BSFC bottom torque (Qf2<Qf1). However, as indicated by characteristic curve f33 (dashed line) of FIG. 11, for example, in a case of accelerating at a torque between BSFC bottom torque and maximum torque, fuel consumption quantity Qf sometimes falls low to beyond Qf2. The reason for this is that fuel consumption quantity Qf required to travel reference distance La is determined by, inter alia, difference between current vehicle speed V0 and target vehicle speed Va so that fuel consumption quantity becomes minimum when the subject vehicle is traveled at a torque between BSFC bottom torque (characteristic curve f12) and maximum torque (characteristic curve f11) of FIG. 8. Accordingly, in the present embodiment, torque that minimizes fuel consumption quantity (target torque Tea) is determined and the subject vehicle is traveled at target torque Tea by performing the low fuel consumption acceleration processing of FIG. 7.

First, in S11 of FIG. 7, travel distance (reference distance La) is calculated on the assumption that the subject vehicle accelerates to target vehicle speed Va at BSFC bottom torque of FIG. 8 (characteristic curve f12). Calculation of reference distance La is begun by calculating travel distance to a first upshift from current speed stage (n stage) to one higher speed stage (n+1 stage) when accelerating to upshift vehicle speed (e.g., V1 of FIG. 9) at BSFC bottom torque. Although engine speed Ne increases when engine torque Te is constant, the calculation here is simplified by using average engine speed in the speed stage concerned (n stage). Next, travel distance to a second upshift to one still higher speed stage (n+2 stage) when accelerating to upshift vehicle speed in the one higher speed stage (n+1 stage) is calculated. Average engine speed in the speed stage concerned (n+1 stage) is also used in this calculation. The aforesaid process is thereafter repeated while upshifting speed stage until vehicle speed V reaches target vehicle speed Va, and reference distance La is calculated by summing the travel distances of the individual speed stages.

Next, in S12, fuel consumption quantity Qf is calculated on the assumption that the subject vehicle travels to reference distance La at predetermined engine torque (acceleration torque). This acceleration torque is suitably defined within a range between BSFC bottom torque and maximum torque. Immediately following completion of the processing S11, BSFC bottom torque is, for example, set as acceleration torque, and fuel consumption quantity Qf1 where acceleration to target vehicle speed Va at BSFC bottom torque is assumed is calculated using an engine efficiency map or the like. On the other hand, when, for example, maximum torque is defined as acceleration torque, a first fuel consumption quantity when accelerating to target vehicle speed Va at maximum torque and a second fuel consumption quantity when cruising to reference distance La, as shown in FIG. 11, are calculated using engine efficiency maps or the like, and total fuel consumption quantity Qf2 is calculated as the sum of the first fuel consumption quantity and the second fuel consumption quantity.

Next, in S13, a predetermined torque increment ΔTe is added to the acceleration torque to update the acceleration torque. Torque increment ΔTe is obtained, for example, by dividing difference between maximum torque and BSFC bottom torque by a predetermined number. Alternatively, torque increment ΔTe can be predefined as a fixed value.

Next, in S14, whether acceleration torque updated in S13 is greater than maximum torque is determined. If a negative decision is made at S14, the routine returns to S12 and similar processing is repeated. In S12, therefore, fuel consumption quantities Qf are calculated for acceleration torques progressively incremented by torque increment ΔTe from BSFC bottom torque to maximum torque. If a positive decision is made at S14, the routine proceeds to S15.

In S15, the acceleration torque associated with smallest fuel consumption quantity Qf calculated in S12 is decided as target torque Tea. The aforesaid processing of S11 to S15 is performed by the action plan generation unit 45, for example, and target torque Tea is included in the action plan generated by the action plan generation unit 45 as an acceleration instruction for acceleration from actual vehicle speed (current vehicle speed) V0 at the present time to target vehicle speed Va. In ensuing S16, the driving control unit 46 outputs control signals to the throttle actuator 13 and injectors 12 to control engine torque of the engine 1 to target torque Tea.

Next, in S17, the driving control unit 46 outputs control signals to the shift actuator 23 to control the transmission 2 in accordance with vehicle speed V of the subject vehicle. Specifically, when actual vehicle speed V detected by the vehicle speed sensor (of the internal sensor group 32) exceeds upshift vehicle speed (characteristic curve f3 of FIG. 9), the driving control unit 46 outputs control signals to the shift actuator 23 to upshift the transmission 2.

However, since upshifting the transmission 2 lowers actual driving force of the subject vehicle, acceleration of the subject vehicle to at least a predefined minimum acceleration A min is apt to be impossible. Therefore, before upshifting, the driving control unit 46 uses current actual driving force and actual acceleration, among other values, to calculate running resistance of the subject vehicle, which varies with vehicle speed V, road gradient and the like, and determines from estimated post-upshift actual driving force and running resistance whether acceleration of or greater than minimum acceleration A min can be achieved after upshifting. And when it determines that acceleration of or greater than minimum acceleration A min cannot be achieved, it prohibits upshifting. Therefore, inability to accelerate after upshifting can be avoided.

Next, in S18, whether current vehicle speed V reached target vehicle speed Va is determined. Alternatively, the determination in S18 can be as to whether difference between current vehicle speed V and target vehicle speed Va became equal to or less than a predetermined value. If a negative decision is made at S18, the routine returns to S16, whereafter the same processing is repeated until current vehicle speed V reaches target vehicle speed Va. If a positive decision is made at S18, low fuel consumption acceleration processing is terminated, and the vehicle is thereafter controlled (ordinarily controlled) in accordance with an action plan including position data and the like along a target path. As a result, the subject vehicle can, for example, cruise at target vehicle speed Va.

Required driving force is set owing to the transition to ordinary control. At this time, initial required driving force is preferably started from actual driving force at termination of low fuel consumption acceleration processing. This inhibits sudden change of actual driving force and helps to reduce shock to the subject vehicle.

Figure 12:
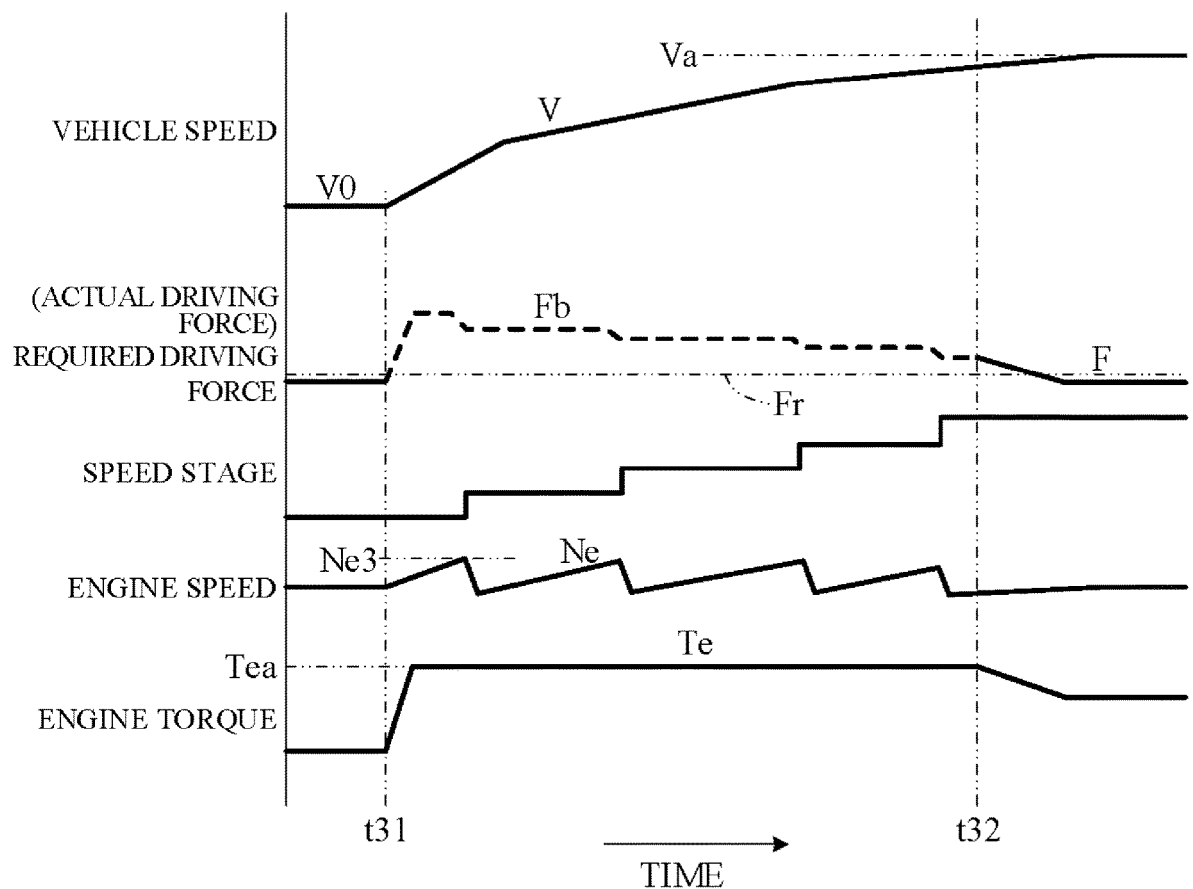
FIG. 12 is a diagram showing an example of timing chart for a case of accelerating under the low fuel consumption acceleration processing.

FIG. 12 is a timing chart for a case of accelerating to target vehicle speed Va under low fuel consumption acceleration processing, showing an example of time-course change of vehicle speed V, required driving force F (solid line) or actual driving force Fb (broken line), speed stage, engine speed Ne and engine torque Te. FIG. 12 is particularly an example of a case in which the subject vehicle travels on a flat road. Running resistance is indicated by Fr.

In the example of FIG. 12, a forward vehicle ceases to be present and low fuel consumption acceleration processing (S5) is started at time t31. At this point, target torque Tea assuring smallest fuel consumption quantity Qf is decided (S15), and the engine 1 is controlled (S16) so that the subject vehicle travels at target torque Tea lying between BSFC bottom torque and maximum torque. Therefore, actual driving force Fb rises, and vehicle speed V gradually increases and engine speed Ne also increases. Once vehicle speed V increases to upshift vehicle speed at the current speed stage, the transmission 2 upshifts (S17). As the upshift vehicle speed at this time is the lowest vehicle speed at which upshift is possible (FIG. 9), increase of engine speed Ne is minimized owing to the transmission 2 upshifting early. A point to be noted in this regard is that engine speed Ne3 at upshift time under low fuel consumption acceleration processing is lower than engine speed Ne4 (FIG. 5) at upshift time under ordinary control.

When the transmission 2 upshifts under constant engine torque, actual driving force Fb decreases. However, since actual driving force Fb is greater than running resistance Fr, the subject vehicle continues to accelerate. When actual vehicle speed V reaches target vehicle speed Va (strictly speaking, when difference between actual vehicle speed and target vehicle speed Va becomes equal to or less than a predetermined value) at time t32, low fuel consumption acceleration processing is terminated and ordinary control implemented. In ordinary control, by way of an example, required driving force F for every unit time Δt is calculated based on an action plan, e.g., an action plan for cruising at target vehicle speed Va, and the engine 1 and transmission 2 are controlled to generate the required driving force F. At ordinary control start time t32, the engine 1 and transmission 2 are controlled using actual driving force Fb at termination of low fuel consumption acceleration processing as required driving force F.

Figure 13:
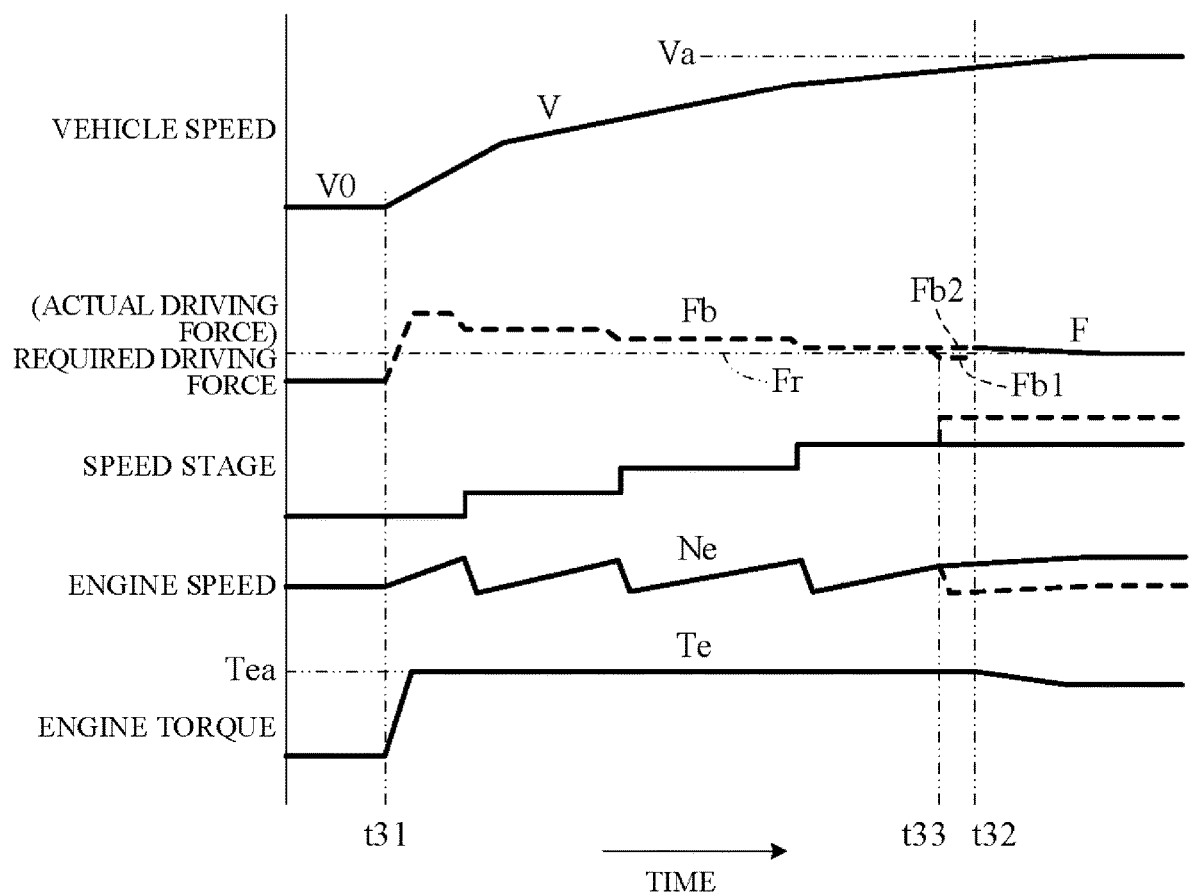
FIG. 13 is a diagram showing another example of timing chart for the case of accelerating under the low fuel consumption acceleration processing.

FIG. 13 is a timing chart for a case of the subject vehicle traveling on an uphill slope, showing an example of time-course change of vehicle speed V, required driving force F (solid line) or actual driving force Fb (broken line), speed stage, engine speed Ne and engine torque Te. Also in the example of FIG. 13, similarly to in the example of FIG. 12, low fuel consumption acceleration processing is performed from time t31 to time 32. In the example of FIG. 13, however, running resistance Fr is greater than in the example of FIG. 12, so that should the transmission 2 be upshifted at time t33 (dashed line) before actual vehicle speed V reaches target vehicle speed Va, actual driving force Fb1 after upshifting would be lower than running resistance Fr, so that the subject vehicle would be incapable acceleration. Upshifting at time t33 is therefore prohibited and the subject vehicle is accelerated to target vehicle speed Va by actual driving force Fb2 larger than running resistance Fr.

The present embodiment can achieve advantages and effects such as the following:

(1) The vehicle control apparatus 100 incorporates self-driving capability and is configured to control the self-driving vehicle 101 including the engine 1 and the transmission 2 installed in the power transmission path from the engine 1 to the drive wheels 3 (FIG. 2). The vehicle control apparatus 100 includes the external sensor group 31 and the exterior recognition unit 44 for detecting surrounding circumstances of the subject vehicle 101, the action plan generation unit 45 for generating an action plan for the subject vehicle 101 based on detected surrounding circumstances, and the driving control unit 46 for controlling the engine 1 and the transmission 2 so the subject vehicle 101 self-drives in accordance with the generated action plan (FIG. 2). The action plan generation unit 45 generates either an action plan (action plan for ordinary control) including at least position data of the subject vehicle for every unit time Δt from current time through predetermined future time period T or an action plan (action plan for low fuel consumption acceleration processing) including acceleration instruction (target torque Tea) from current speed V0 of the subject vehicle to target vehicle speed Va and not including position data for every unit time Δt. Upon generation of an action plan for ordinary control by the action plan generation unit 45, the driving control unit 46 controls the engine 1 and transmission 2 so the subject vehicle 101 runs in accordance with position data for every unit time Δt. On the other hand, upon generation by the action plan generation unit 45 of an action plan for low fuel consumption acceleration processing, the driving control unit 46 controls the engine 1 and transmission 2 so the subject vehicle 101 accelerates to target vehicle speed Va at target torque Tea that is a torque lying between the characteristic curve f11 of maximum torque and characteristic curve f12 of BSFC bottom torque, which are dependent on engine speed Ne, and a torque that minimizes fuel consumption quantity while the subject vehicle travels reference distance La, i.e., fuel consumption quantity per unit travel distance (FIGS. 7 and 8).

Thus, in the present embodiment, required driving force is not defined during low fuel consumption acceleration processing, and the engine 1 is operated to increase actual vehicle speed V to target vehicle speed Va at a target torque Tea that assures lowest fuel consumption. Although attainment of required driving force (travel acceleration) often leads to generation of excessive acceleration torque that degrades fuel economy, no excessive acceleration torque is generated in the present embodiment because it does not define required driving force in the first place. Moreover, fuel consumption quantity required to accelerate to target vehicle speed Va and travel reference distance La is held to minimum because target torque Tea is set between BSFC bottom torque and maximum torque. In addition, noise can be kept low because engine speed is held down. Thus, when operating in low fuel consumption mode in accordance with the present embodiment, acceleration is performed at high torque low rpm of the engine 1, thereby achieving improved fuel economy and optimum acceleration for a noise-reduced self-driving vehicle.

(2) Defining reference distance La as travel distance of the subject vehicle 101 to target vehicle speed Va when traveling at BSFC bottom torque on characteristic curve f12, target torque Tea is larger than BSFC bottom torque and torque that minimizes fuel quantity consumed when subject vehicle 101 accelerates to target vehicle speed Va and thereafter cruises up to reference distance La. As a result, fuel consumed to reach target vehicle speed Va and run reference distance La can be held to minimum and fuel economy performance enhanced to maximum.

(3) In ordinary control, the driving control unit 46 controls the transmission 2 to downshift when operating point Q1 (first operating point) dependent on vehicle speed V and required driving force F at the present time crosses a predefined downshift curve (characteristic curve f2) and to upshift when operating point Q3 (second operating point) obtained by adding a certain excess driving force Fa to operating point Q2 crosses a predefined upshift curve (characteristic curve f1) (FIG. 4). In low fuel consumption acceleration processing, on the other hand, the driving control unit 46 controls the transmission 2 to upshift when vehicle speed V0 at the present time exceeds upshift vehicle speed (characteristic curve f3) predefined in a range between equal to or greater than minimum vehicle speed V2 of a downshift curve and equal to or less than minimum vehicle speed V1 of an upshift curve (FIG. 9). Since the transmission 2 can therefore upshift at minimum vehicle speed, increase of engine speed is minimized.

(4) The driving control unit 46 calculates running resistance Fr of the subject vehicle 101, determines based on the calculated running resistance Fr whether post-upshift travel acceleration is to be equal to or greater than predetermined value A min, and when determined to be less than predetermined value A min, prohibits upshifting (FIG. 13). A situation in which upshifting reduces actual driving force to the point of making acceleration impossible can therefore be prevented.

(5) When the external sensor group 31 and the exterior recognition unit 44 do not detect a forward vehicle 102 followed in self-driving by the subject vehicle 101 ahead, the action plan generation unit 45 generates an action plan for low fuel consumption acceleration processing. As a result, low fuel consumption acceleration processing capable of achieving enhanced fuel economy performance and reduced noise level can be performed at optimum time when no distinct acceleration demand with respect to a forward vehicle 102 is present.

In the aforesaid embodiment, the action plan generation unit 45 generates the action plan for ordinary control (first action plan) and the action plan for low fuel consumption acceleration processing (second action plan). And second action plan is particularly adapted to include the acceleration instruction for acceleration from current vehicle speed V0 to target vehicle speed Va. However, a first action plan can be of any content insofar as it includes target position data of the self-driving vehicle set every the unit time Δt within time period T of the present time, and the second action plan can be of any content insofar as it includes acceleration instruction for acceleration from vehicle speed V0 of the subject vehicle 101 at the present time to target vehicle speed Va and not does not include position data set every the unit time Δt. Therefore, the action plan generation unit is not limited to the aforesaid configuration.

In the aforesaid embodiment, the driving control unit 46 is adapted to control the engine 1 and transmission 2 in the course of low fuel consumption acceleration processing so that the subject vehicle 101 accelerates to target vehicle speed Va at target torque Tea between characteristic curve f11 (first characteristic curve) of maximum torque and characteristic curve f12 (second characteristic curve) of BSFC bottom torque, which are dependent on engine speed Ne. However, the driving control unit 46 is not limited to this configuration. In other words, a driving control unit is not limited to this configuration insofar as it controls the engine 1 and transmission 2 so that when the action plan generation unit 45 generates the first action plan, the subject vehicle 101 travels in accordance with position data set every unit time, and when the action plan generation unit 45 generates the second action plan, the subject vehicle 101 accelerates to target vehicle speed Va at a target torque that lies between a first characteristic curve representing maximum torque dependent on engine speed and a second characteristic curve representing torque dependent on engine speed that assures minimum brake-specific fuel consumption and that is set so as to minimize a fuel consumption quantity per a unit travel distance.

Although in the aforesaid embodiment, the exterior recognition unit 44 is adapted to recognize external conditions based on detection values of the external sensor group 31, a surrounding circumstances detector for detecting surrounding circumstances of the subject vehicle is not limited to the aforesaid configuration. Although in the aforesaid embodiment, the driving control unit 46 is adapted to calculate target acceleration and required driving force based on the action plan, the action plan generation unit 45, instead of the driving control unit 46, can optionally be adapted to calculate target acceleration or calculate target acceleration and required driving force and output the calculated data by including them in the associated action plan. Therefore, data output as an action plan is not limited to those set out in the foregoing.

Although in the aforesaid embodiment, the engine 1 is used as the drive power source of the self-driving vehicle 101, use of a travel motor (electric motor) in addition to the engine is also possible. In such case, it suffices to configure the driving control unit to control the engine, travel motor and transmission so that the self-driving vehicle 101 self-drives in accordance with the action plan. Although the aforesaid embodiment is explained with respect to an example using a stepped transmission, the present invention can be similarly applied in the case of using a continuously variable transmission.

The present invention can also be used as a vehicle control method for controlling a self-driving vehicle with a self-driving capability including an engine, drive wheels, and a transmission installed in a power transmission path from the engine to the drive wheels.

The above embodiment can be combined as desired with one or more of the above modifications. The modifications can also be combined with one another.

According to the present invention, when acceleration is needed with no distinct target acceleration, it is possible to accelerate a self-driving vehicle to a target vehicle speed while minimizing fuel consumption quantity.

Above, while the present invention has been described with reference to the preferred embodiments thereof, it will be understood, by those skilled in the art, that various changes and modifications may be made thereto without departing from the scope of the appended claims.

What is claimed is:

1. A vehicle control apparatus for controlling a self-driving vehicle with a self-driving capability including an engine, drive wheels, and a transmission installed in a power transmission path from the engine to the drive wheels, comprising:
    a surrounding circumstances detector configured to detect surrounding circumstances of the self-driving vehicle; and
    an electric control unit including a microprocessor and a memory, wherein
    the microprocessor is configured to perform:
        generating an action plan of the self-driving vehicle based on the surrounding circumstances detected by the surrounding circumstances detector; and
        controlling the engine and the transmission so that the self-driving vehicle travels by self-driving in accordance with the action plan generated, wherein
    the generating includes generating a first action plan and a second action plan, the first action plan including target position data of the self-driving vehicle set every a unit time within a predetermined time period of a present time, the second action plan including an acceleration instruction from a vehicle speed of the self-driving vehicle at a present time to a target vehicle speed not including the target position data set every the unit time, and
    the controlling includes controlling the engine and the transmission, so that the self-driving vehicle travels in accordance with the target position data set every the unit time when the first action plan is generated, while so that the self-driving vehicle accelerates to the target vehicle speed at a target torque when the second action plan is generated, the target torque being set between a first characteristic curve representing a maximum torque relative to an engine speed and a second characteristic curve representing a torque corresponding to a minimum brake-specific fuel consumption relative to the engine speed and being set so as to minimize a fuel consumption quantity per a unit travel distance.

2. The apparatus according to claim 1, wherein under an assumption that a travel distance when the self-driving vehicle travels to the target vehicle speed at a torque on the second characteristic curve is defined as a reference distance, the target torque is larger than the torque on the second characteristic curve and is set so as to minimize a fuel consumed while the self-driving vehicle accelerates to the target vehicle speed and thereafter cruises up to the reference distance.

3. The apparatus according to claim 2, wherein the microprocessor is configured to perform
    the controlling including controlling the transmission, if the first action plan is generated, so as to downshift when a first operating point in accordance with the vehicle speed and a required driving force at the present time crosses a predetermined downshift curve, while so as to upshift when a second operating point obtained by adding a predetermined excess driving force to the first operating point crosses a predetermined upshift curve, and if the second action plan is generated, so as to upshift when the vehicle speed at the present time excess a vehicle speed predetermined within a range greater than or equal to a minimum vehicle speed of the downshift curve and less than or equal to a minimum vehicle speed of the upshift curve.

4. The apparatus according to claim 3, wherein the microprocessor is configured to perform the controlling including calculating a running resistance of the self-driving vehicle, determining whether a travel acceleration estimated after upshifting is greater than or equal to a predetermined acceleration based on the running resistance calculated, and prohibiting upshifting when it is determined that the travel acceleration estimated after upshifting is less than the predetermined acceleration.

5. The apparatus according to claim 1, wherein the microprocessor is configured to perform the generating including generating the second action plan when a forward vehicle targeted for following ahead of the self-driving vehicle is not detected by the surrounding circumstances detector.

6. The apparatus according to claim 1, wherein the microprocessor is configured to perform the controlling including setting a target acceleration based on the first action plan and controlling the engine and the transmission in accordance with the target acceleration when the first action plan is generated, while not to setting the target acceleration and controlling the engine and the transmission when the second action plan is generated.

7. A vehicle control apparatus for controlling a self-driving vehicle with a self-driving capability including an engine, drive wheels, and a transmission installed in a power transmission path from the engine to the drive wheels, comprising:

a surrounding circumstances detector configured to detect surrounding circumstances of the self-driving vehicle;

an action plan generation unit configured to generate an action plan of the self-driving vehicle based on the surrounding circumstances detected by the surrounding circumstances detector; and a driving control unit configured to control the engine and the transmission so that the self-driving vehicle travels by self-driving in accordance with the action plan generated by the action plan generation unit, wherein the action plan generation unit is configured to generate a first action plan and a second action plan, the first action plan including target position data of the self-driving vehicle set every a unit time within a predetermined time period of a present time, the second action plan including an acceleration instruction from a vehicle speed of the self-driving vehicle at a present time to a target vehicle speed not including the target position data set every the unit time, and the driving control unit is configured to control the engine and the transmission, so that the self-driving vehicle travels in accordance with the target position data set every the unit time when the first action plan is generated by the action plan generation unit, while so that the self-driving vehicle accelerates to the target vehicle speed at a target torque when the second action plan is generated by the action plan generation unit, the target torque being set between a first characteristic curve representing a maximum torque relative to an engine speed and a second characteristic curve representing a torque corresponding to a minimum brake-specific fuel consumption relative to the engine speed and being set so as to minimize a fuel consumption quantity per a unit travel distance.

8. The apparatus according to claim 7, wherein under an assumption that a travel distance when the self-driving vehicle travels to the target vehicle speed at a torque on the second characteristic curve is defined as a reference distance, the target torque is larger than the torque on the second characteristic curve and is set so as to minimize a fuel consumed while the self-driving vehicle accelerates to the target vehicle speed and thereafter cruises up to the reference distance.

9. The apparatus according to claim 8, wherein the driving control unit is configured to control the transmission, if the first action plan is generated by the action plan generation unit, so as to downshift when a first operating point in accordance with the vehicle speed and a required driving force at the present time crosses a predetermined downshift curve, while so as to upshift when a second operating point obtained by adding a predetermined excess driving force to the first operating point crosses a predetermined upshift curve, and if the second action plan is generated by the action plan generation unit, so as to upshift when the vehicle speed at the present time excess a vehicle speed predetermined within a range greater than or equal to a minimum vehicle speed of the downshift curve and less than or equal to a minimum vehicle speed of the upshift curve.

10. The apparatus according to claim 9, wherein the driving control unit is configured to calculate a running resistance of the self-driving vehicle, determine whether a travel acceleration estimated after upshifting is greater than or equal to a predetermined acceleration based on the running resistance calculated, and prohibit upshifting when it is determined that the travel acceleration estimated after upshifting is less than the predetermined acceleration.

11. The apparatus according to claim 7, wherein the action plan generation unit is configured to generate the second action plan when a forward vehicle targeted for following ahead of the self-driving vehicle is not detected by the surrounding circumstances detector.

12. The apparatus according to claim 7, wherein the driving control unit is configured to set a target acceleration based on the first action plan and control the engine and the transmission in accordance with the target acceleration when the first action plan is generated by the action plan generation unit, while not to set the target acceleration and control the engine and the transmission when the second action plan is generated by the action plan generation unit.

13. A vehicle control method for controlling a self-driving vehicle with a self-driving capability including an engine, drive wheels, and a transmission installed in a power transmission path from the engine to the drive wheels, comprising:

detecting surrounding circumstances of the self-driving vehicle;

generating an action plan of the self-driving vehicle based on the surrounding circumstances detected; and controlling the engine and the transmission so that the self-driving vehicle travels by self-driving in accordance with the action plan generated, wherein the generating includes generating a first action plan and a second action plan, the first action plan including target position data of the self-driving vehicle set every a unit time within a predetermined time period of a present time, the second action plan including an acceleration instruction from a vehicle speed of the self-driving vehicle at a present time to a target vehicle speed not including the target position data set every the unit time, and the controlling includes controlling the engine and the transmission, so that the self-driving vehicle travels in accordance with the target position data set every the unit time when the first action plan is generated, while so that the self-driving vehicle accelerates to the target vehicle speed at a target torque when the second action plan is generated, the target torque being set between a first characteristic curve representing a maximum torque relative to an engine speed and a second characteristic curve representing a torque corresponding to a minimum brake-specific fuel consumption relative to the engine speed and being set so as to minimize a fuel consumption quantity per a unit travel distance.

14. The method according to claim 13, wherein under an assumption that a travel distance when the self-driving vehicle travels to the target vehicle speed at a torque on the second characteristic curve is defined as a reference distance, the target torque is larger than the torque on the second characteristic curve and is set so as to minimize a fuel consumed while the self-driving vehicle accelerates to the target vehicle speed and thereafter cruises up to the reference distance.

15. The method according to claim 14, wherein the controlling includes controlling the transmission, if the first action plan is generated, so as to downshift when a first operating point in accordance with the vehicle speed and a required driving force at the present time crosses a predetermined downshift curve, while so as to upshift when a second operating point obtained by adding a predetermined excess driving force to the first operating point crosses a predetermined upshift curve, and if the second action plan is generated, so as to upshift when the vehicle speed at the present time excess a vehicle speed predetermined within a range greater than or equal to a minimum vehicle speed of the downshift curve and less than or equal to a minimum vehicle speed of the upshift curve.

16. The method according to claim 15, wherein the controlling includes calculating a running resistance of the self-driving vehicle, determining whether a travel acceleration estimated after upshifting is greater than or equal to a predetermined acceleration based on the running resistance calculated, and prohibiting upshifting when it is determined that the travel acceleration estimated after upshifting is less than the predetermined acceleration.

17. The method according to claim 13, wherein the generating includes generating the second action plan when a forward vehicle targeted for following ahead of the self-driving vehicle is not detected.

18. The method according to claim 13, wherein the controlling includes setting a target acceleration based on the first action plan and controlling the engine and the transmission in accordance with the target acceleration when the first action plan is generated, while not to setting the target acceleration and controlling the engine and the transmission when the second action plan is generated.

* * * * *